(12) United States Patent
Stefan et al.

(10) Patent No.: US 6,708,110 B2
(45) Date of Patent: Mar. 16, 2004

(54) METHOD OF PROVIDING VEHICLE INSTRUCTIONS TO A NON-NAVIGABLE POINT OF INTEREST

(75) Inventors: Jeffrey M. Stefan, Clawson, MI (US); Jasmin Jijina, Novi, MI (US)

(73) Assignee: General Motors Corporation, Detroit, MI (US)

( * ) Notice: Subject to any disclaimer, the term of this patent is extended or adjusted under 35 U.S.C. 154(b) by 173 days.

(21) Appl. No.: 10/003,001

(22) Filed: Nov. 1, 2001

(65) Prior Publication Data

US 2003/0083810 A1 May 1, 2003

(51) Int. Cl.$^7$ ............................................... G01C 21/34
(52) U.S. Cl. .................... 701/209; 701/202; 340/995.19
(58) Field of Search ................................. 701/202, 208, 701/209, 210, 211; 340/990, 995.1, 995.19, 995.23

(56) References Cited

U.S. PATENT DOCUMENTS

| | | | | |
|---|---|---|---|---|
| 5,067,081 A | * | 11/1991 | Person | 701/202 |
| 5,475,598 A | * | 12/1995 | Fushimi et al. | 701/202 |
| 5,906,654 A | * | 5/1999 | Sato | 701/210 |
| 5,911,775 A | * | 6/1999 | Tanimoto | 701/210 |
| 5,964,821 A | * | 10/1999 | Brunts et al. | 701/201 |
| 5,991,688 A | * | 11/1999 | Fukushima et al. | 701/209 |
| 6,034,626 A | | 3/2000 | Maekawa et al. | |
| 6,278,942 B1 | | 8/2001 | McDonough | |
| 6,487,496 B2 | | 11/2002 | Katayama et al. | |
| 6,507,291 B1 | * | 1/2003 | Schreiner | 340/995.1 |

* cited by examiner

*Primary Examiner*—Gary Chin
(74) *Attorney, Agent, or Firm*—Anthony Luke Simon

(57) ABSTRACT

The present invention provides a system, a method and a computer usable medium including a program for generating navigation instructions for a vehicle. This may be done by determining a bearing between a destination point and a current location point of the vehicle, determining a proximity perimeter with radius (R) of a destination point and selecting a termination point within the proximity perimeter that is closest to the destination point as the vehicle path end point.

It may also be done by determining a current location of a client vehicle on a route, determining a destination point longitude and latitude in a digital map database and by determining if a destination point is located in a digital map database.

It may also be done by determining a destination point proximity perimeter with radius (R); if it is determined that a selected destination point is not located in a digital map database and by determining a distance between each termination point and the destination point, if more than one termination point exists within destination point proximity perimeter;

It may also be done by determining the termination point within the destination point perimeter, with the shortest distance to the destination point.

16 Claims, 4 Drawing Sheets

METHOD OF PROVIDING VEHICLE INSTRUCTIONS TO A NON-NAVIGABLE POINT OF INTEREST

FIELD OF THE INVENTION

This invention relates generally to the navigation of a moving vehicle. In particular, this invention relates to a method and system for providing vehicle instructions to a non-navigable point of interest.

BACKGROUND OF THE INVENTION

Electronic Navigation Systems continue to provide tremendous value in everyday applications. Widespread commercial use has increased the need for designing systems that are both reliable and reasonably priced.

Electronic Navigation Systems contain digital map databases that contain various points of interest. Navigation to these points of interest is accomplished by the connecting and matching of road segments. Often, some of the road segments change or the points of interest become obsolete and as a result may be identified by the navigation system as "non-navigable" points.

It would be desirable therefore to provide a method for identifying a navigable location within a reasonable proximity of a non-navigable point of interest to provide more effective navigation instructions to a moving vehicle that overcomes the above.

SUMMARY OF THE INVENTION

One aspect of the present invention provides a method for generating navigation instructions for a vehicle.

A destination point is established through user intervention (e.g., onboard system keypad entry) or an automated input.

A proximity perimeter with radius (R) of a destination point and a bearing between a destination point and a current location point of the vehicle is determined.

A distance between each termination point and the destination point is determined and a termination point within the destination point perimeter, with the shortest distance to the destination point is also determined.

A termination point within the destination point perimeter that is closest to the destination point is selected as the vehicle path end point.

Another aspect of the system provides a computer usable medium including a program for generating navigation instructions for a vehicle, comprising:

The program may include computer readable program code that establishes a destination point through user intervention (e.g., onboard system keypad entry) or an automated input.

The program may also include computer readable program code that determines a proximity perimeter with radius (R) of a destination point and a bearing between a destination point and a current location point of the vehicle.

The program may also include computer readable program code that determines a distance between each termination point and the destination point and determines a termination point within the destination point perimeter, with the shortest distance to the destination point.

The program may include computer readable program code that selects a termination point within the destination point perimeter that is closest to the destination point as the vehicle path end point.

Another aspect of the present invention provides a system for generating navigation instructions for a vehicle, comprising:

The system may include means for establishing a destination point through user intervention (e.g., onboard system keypad entry) or an automated input and means for determining a proximity perimeter with radius (R) of a destination point and a bearing between a destination point and a current location point of the vehicle.

The system may also include means for determining a distance between each termination point and the destination point and means for determining a termination point within the destination point perimeter, with the shortest distance to the destination point.

The system may also include means for determining a termination point within the destination point perimeter, with the shortest distance to the destination point and means for selecting a termination point within the destination point perimeter that is closest to the destination point as the vehicle path end point.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
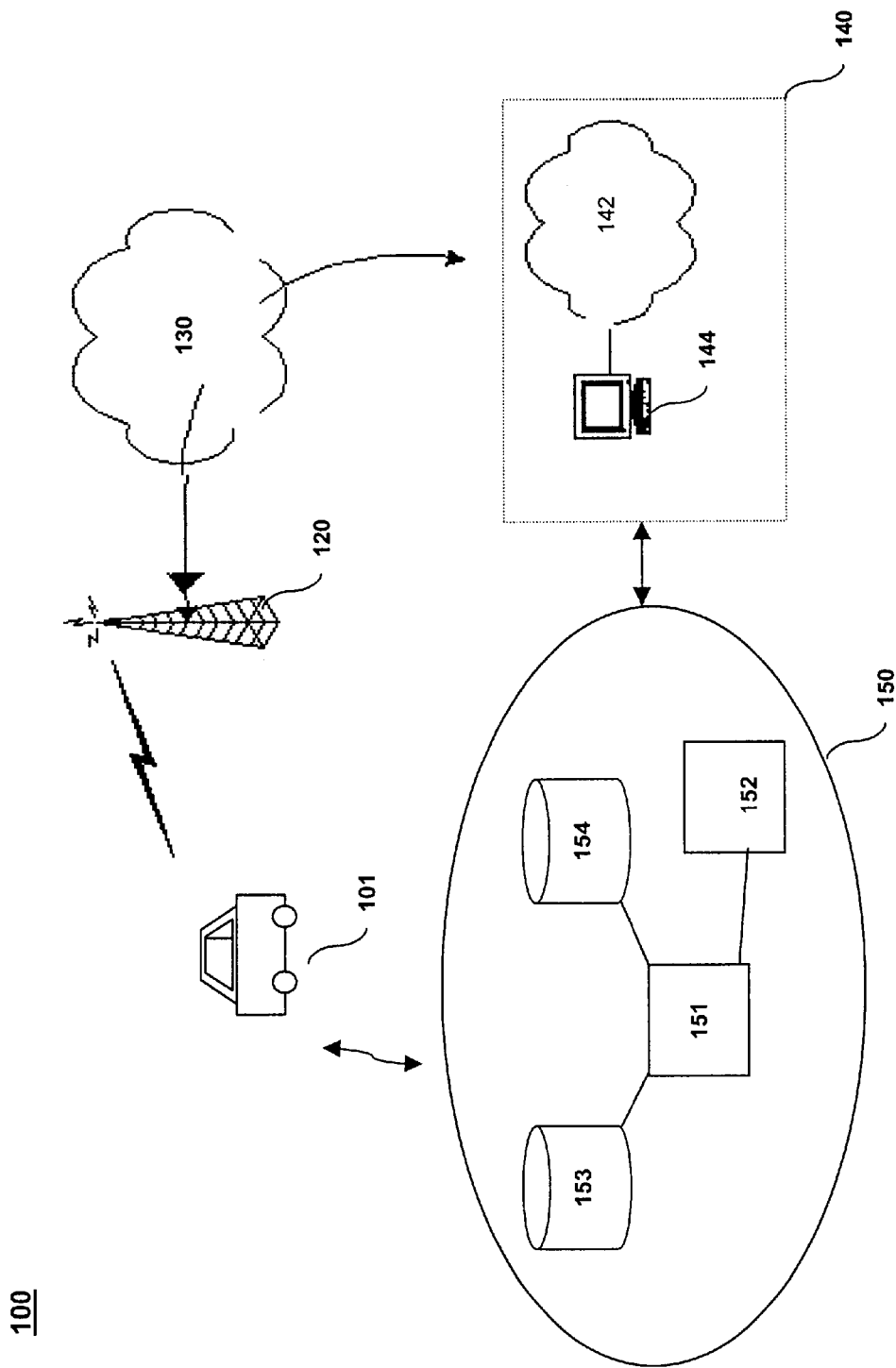
FIG. 1 is a schematic diagram of a system for generating navigation information for a vehicle in accordance with the present invention.

FIG. 1 shows one embodiment of a system for providing services to a vehicle in accordance with the present invention at 100.

The system may include one or more vehicle clients 101, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

Navigation subsystem 150 is a system for generating routes to be delivered to vehicle client 101 and for receiving route information from vehicle client 101. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 101. In one embodiment of the invention, navigation subsystem 150 comprises one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 101 may be any suitable vehicle. For example, the vehicle may be an automobile or a passenger-carrying unit such as a bus or train. Alternatively, vehicle client 101 may be an occupant of the vehicle or any suitable client device contained in the vehicle. In one embodiment of the invention, vehicle client 101 is a mobile or portable device equipped to communicate with service management subsystem 140. Carrier system 120 is any suitable system for transmitting a signal from vehicle 101 to service management subsystem 140. Carrier system 120 may also transmit a signal from service management subsystem 140 to vehicle client 101. In one embodiment of the invention, carrier system 120 is a wireless carrier system as is well known in the art. Carrier system 120 may be; for example, a transmitter/receiver unit attached to vehicle client 101. Alternatively, carrier system 120 may be a separate transmitter/receiver carried by vehicle client 101.

Communication network 130 is any suitable system for communicating between vehicle client 101 and service management subsystem 140. In one embodiment of the invention, communication network is a public switched telephone network (PSTN). Alternatively, communication network 130 may be a multiprotocol Internet or Intranet capable or transmitting voice and/or data in either analog or digital form or a combination of both. Alternatively, communication network 130 may be a hybrid communication network or virtual network.

Service management subsystem 140 is a system for managing a variety of services to be delivered to or from vehicle client 101. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
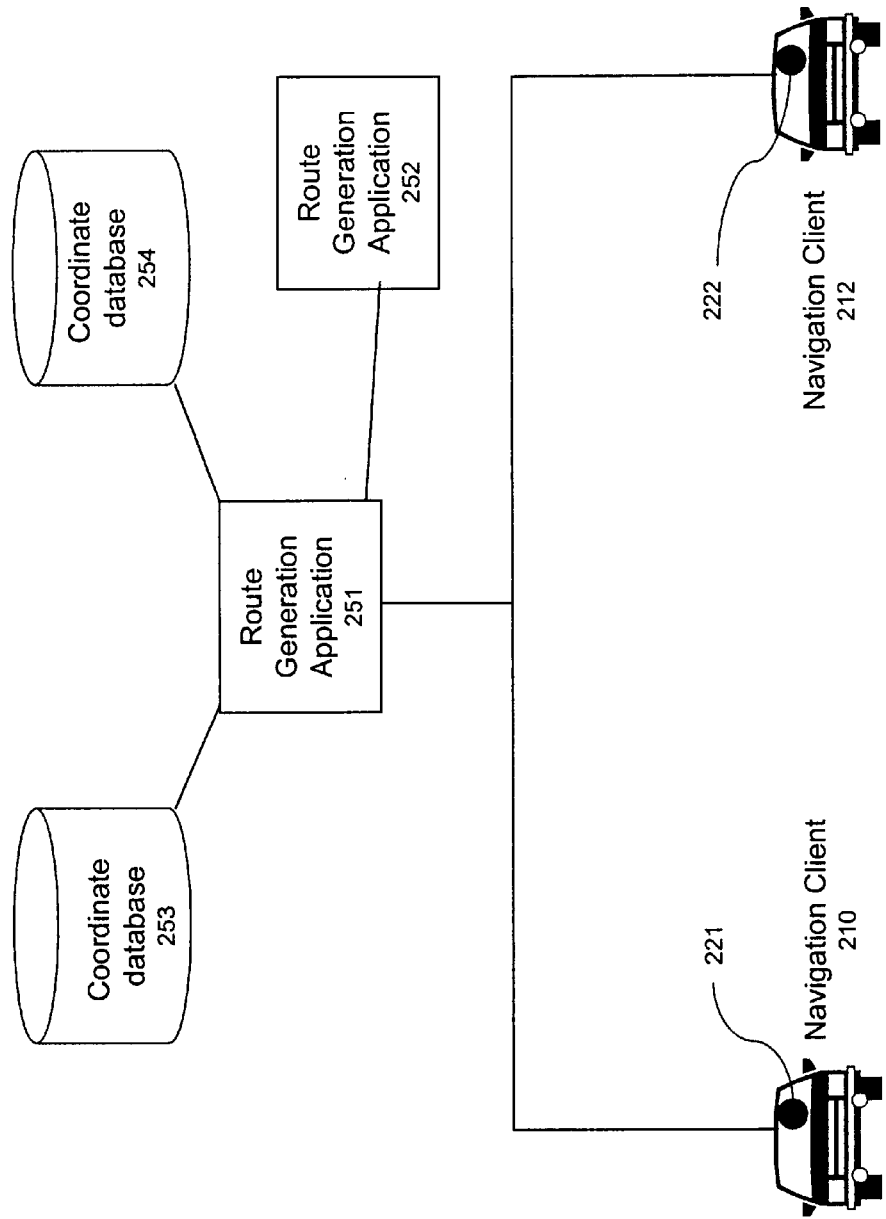
FIG. 2 is a schematic diagram of another embodiment of a system for generating navigation information for a vehicle in accordance with the present invention.

FIG. 2 shows one embodiment of a navigation system in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212, which may be used to navigate vehicle client 210, 212. For example, in-vehicle navigator 221, 222 may be a driver. Alternatively, in-vehicle navigator 221, 222 may be an automatic system for navigating vehicle 210, 212.

Route generation applications 251, 252 may be any suitable application for calculating maneuver lists of directions between one or more locations. For example, route generation applications 251, 252 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding. That is, the application 251, 252 determines a corresponding latitude and longitude based on an input navigation address. Alternatively, route generation applications 251, 252 may generate routes using reverse geocoding. That is, the application 251, 252 determines a corresponding navigation address based on input latitude and longitude coordinates.

Coordinate databases 253, 254 may be any suitable databases for storing such location coordinates as latitude and longitude of a variety of locations. These locations may be, for example, points of interest. Coordinate databases 253, 254 may also be a database of street addresses. Coordinate databases 253, 254 may also be a database of routes between points.

Figure 3:
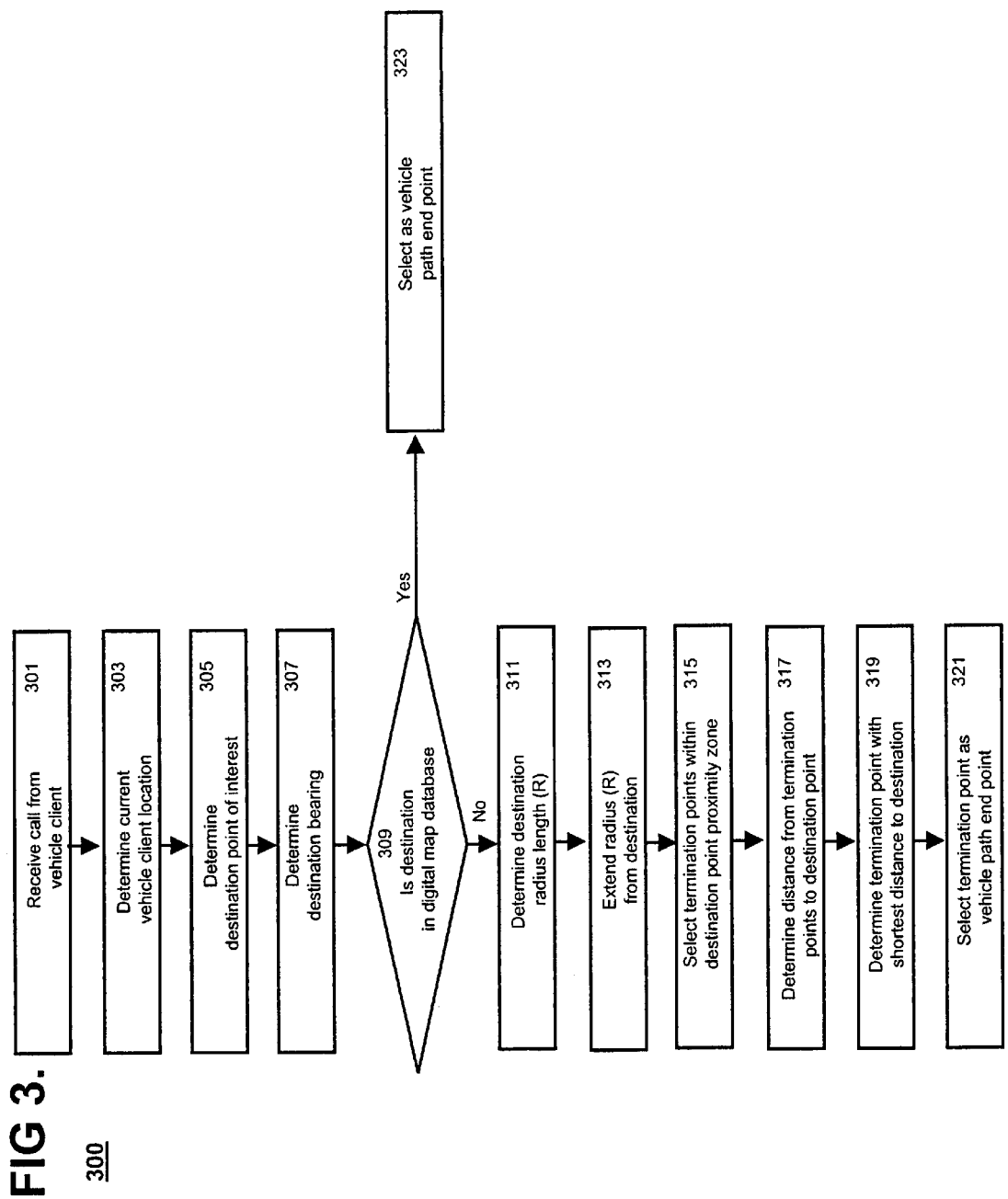
FIG. 3 is a flow diagram of one embodiment of a method for identifying a navigable location within a reasonable proximity of a non-navigable point of interest, to generate navigation information for a vehicle in accordance with the present invention.

FIG. 3 shows a flow diagram of one embodiment of a method identifying a navigable location within a reasonable proximity of a non-navigable point of interest to generate navigation information in accordance with the present invention at 300.

As seen at block 301, a call may be received from vehicle client 101. This call may be a voice command or a vehicle client generated electronic command or another suitable means of transmitting location data. As the client is navigating along a route it may calculate the bearing or may receive the bearing data from a Global Positioning System (GPS) for example. The client may then transmit the longitude and latitude coordinates of its current location to the server based navigation subsystem (block 303). The vehicle destination is then transmitted to the navigation system (block 305). After receiving this destination location data, the bearing of the vehicle with respect to the destination is determined (block 307) by a method known in the art. This establishes the direction that the vehicle is navigating. On the server, determination may be made, whether the destination point is identified in the digital map database (block 309) or not. This destination point information may then be downloaded to the vehicle client. If it is determined that the destination point is located within the digital map database, the destination is selected as the termination point of the vehicle path (block 323).

As seen in block 311, if the destination point is not in the digital map database, a radius length (R) may be determined and extended from the destination point to determine a circular proximity zone (block 313). Termination points within this proximity zone may be selected (block 315) and the distance between these termination points and the destination point individually may be calculated (block 317). The distance from a termination point within the proximity zone to the destination point may be compared to the distance from a next termination point within the proximity zone to the destination point. If the distance between a termination point and a destination point exceeds the distance from a next termination point within a proximity zone and the destination point, the first termination point may be ignored. Likewise, the next termination point may be selected for a distance comparison to the distance between a third termination point and the destination point. This process is repeated until all of the termination points within the proximity diameter have been analyzed (block 319). Select the remaining termination point as vehicle path end point (block 321).

Figure 4:
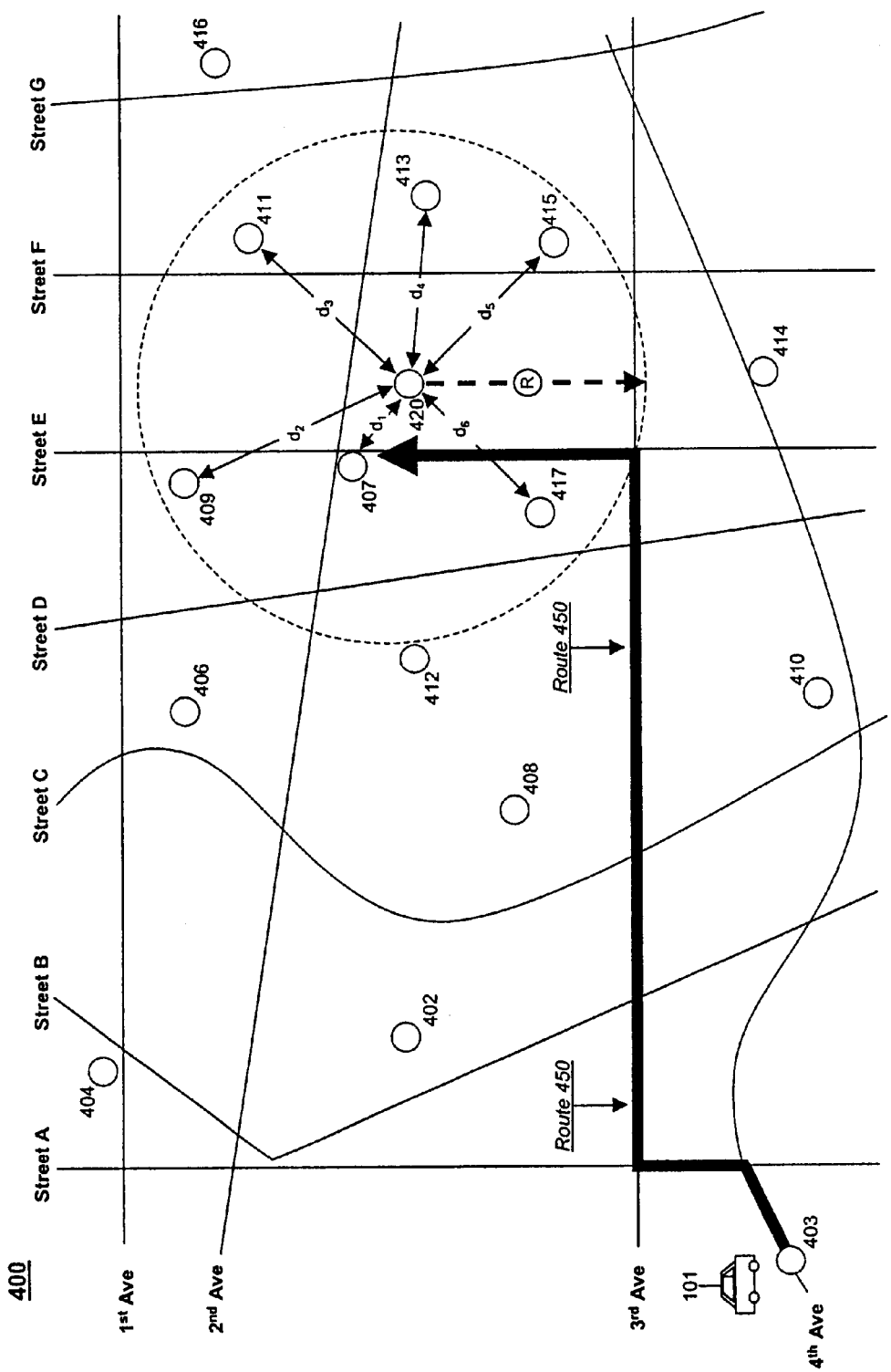
FIG. 4 is a sequence diagram of one embodiment of a method for identifying a navigable location within a reasonable proximity of a non-navigable point of interest for generating navigation information for a vehicle in accordance with the present invention.

FIG. 4 is a sequence diagram of one embodiment of a method for identifying a navigable location within a reasonable proximity of a non-navigable point of interest for generating navigation information for a vehicle in accordance with the present invention at 400.

Points 402, 404, 406, 408, 410, 412, 414, 407, 409, 411, 413, 415, 416, 417 may be points of interest located in a digital map database. Point 403 is the starting point of client vehicle 101 navigating on route 450.

While the vehicle is at starting point 403 the longitude and latitude coordinates of its current position may be input into the onboard navigation system. A destination point of interest may also be input into the client navigation system via various electronic or manual methods. For example, a call can be made to an agent, who may key the destination information directly into the navigation server.

In this example, before the vehicle begins travelling, point 420 may be input into the navigation system server as the final destination point of interest for vehicle client 101. The digital map database may then be reviewed to locate road segments that navigate to the destination point 420. It may be determined that point 420 is non-navigable based on the digital map database and thus it is necessary to identify another point near point 420 that is navigable. A radius (R) may be used to create a proximity perimeter around point 420. The proximity perimeted may be the outer edge of the proximity zone. Points 407, 409, 411, 413, 415, 417 are identified as all of the navigable termination points in the digital map database physically located within the destination point 420 proximity perimeter. The distance may be calculated from each navigable termination point to the destination point 420. After each termination point to destination point distance (d1, d2, d3, d4, d5 and d6) is calculated for each termination point within the proximity diameter, the distances are compared to determine the shortest. Since d1 is the shortest distance, its associated termination point 407 may be selected as the navigating vehicle path end point. Vehicle instructions may then be provided to the vehicle path end point as is known in the art.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing vehicle instructions to a non-navigable destination point, the method comprising:

determining a bearing between the destination point and a current location point of a vehicle;

determining a proximity zone around the destination point;

selecting one of a plurality of navigable termination pointswithin the proximity zone that is closest to the destination point as a vehicle path end point; and providing said navigation instructions to the selected navigable termination point.

2. The method of claim 1, wherein determining a proximity range comprises extending a radius from the destination point.

3. The method of claim 1, further comprising:

determining a longitude and latitude point to indicate the destination point in a digital map database.

4. The method of claim 2, further comprising:

determining a distance between each termination point within the proximity range and the destination point, and selecting the termination point having the shortest distance to the destination point as the closest destination point.

5. A computer usable medium including a program for generating navigation instructions for a vehicle, the program comprising:

computer readable program code that determines a bearing between a destination point and a current location point of the vehicle;

computer readable program code that selects one of a plurality of termination pointswithin a proximity perimeter that is closet to a said destination point as the vehicle path end point;

computer readable program code that determines the proximity perimeter with radius (R) of the destination point; and computer readable program code that generates said navigation instructions to the selected termination point.

6. The program of claim 5 further comprising:

computer readable program code that determines a current location of a vehicle on a route.

7. The program of claim 5 further comprising:

computer readable program code that determines a destination point longitude and latitude in a digital map database.

8. The program of claim 7 further comprising:

computer readable program code that determines said destination point proximity perimeter with radius (R); if it is determined that said selected termination point is not located in said digital map database.

9. The program of claim 5 further comprising:

computer readable program code that determines a distance between each termination point and the destination point, if more than one termination point exists within said destination point proximity perimeter.

10. The program of claim 5 further comprising:

computer readable program code that determines the termination point within the destination point proximity perimeter, with the shortest distance to the destination point.

11. A system for generating navigation instructions for a vehicle, the system comprising:

means for determining a bearing between a destination point and a current location point of the vehicle;

means for determining a proximity perimeter with radius (R) of said destination point;

means for selecting one of a plurality of termination points within the proximity perimeter that is closest to the destination point as the vehicle path end point; and means for generating said navigation instructions to the selected termination point.

12. The system of claim 11, further comprising:

means for determining a current location of a vehicle on a route.

13. The system of claim 11, further comprising:

means for determining a destination point longitude and latitude in a digital map database.

14. The system of claim 13, wherein said means for determining said destination point proximity perimeter with radius (R); if it is determined that said selected termination point is not located in said digital map database.

15. The system of claim 13, further comprising:

means for determining a distance between each termination point and the destination point, if more than one termination point exists within said destination point proximity perimeter.

16. The system of claim 13, further comprising:

means for determining the termination point within the destination point proximity perimeter, with the shortest distance to the destination point.

\* \* \* \* \*